United States Patent
Kuehnle et al.

(10) Patent No.: US 12,192,620 B2
(45) Date of Patent: Jan. 7, 2025

(54) SYSTEM AND METHOD FOR OPPORTUNISTIC IMAGING

(71) Applicant: RM ACQUISITION, LLC, Boise, ID (US)

(72) Inventors: Andreas U. Kuehnle, Villa Park, CA (US); Zheng Li, Irvine, CA (US)

(73) Assignee: RM ACQUISITION, LLC, Boise, ID (US)

( * ) Notice: Subject to any disclaimer, the term of this patent is extended or adjusted under 35 U.S.C. 154(b) by 0 days.

(21) Appl. No.: 17/576,677

(22) Filed: Jan. 14, 2022

(65) Prior Publication Data
US 2023/0232098 A1    Jul. 20, 2023

(51) Int. Cl.
*H04N 23/667* (2023.01)
*B60W 40/02* (2006.01)
*B60W 40/08* (2012.01)
*H04N 7/18* (2006.01)

(52) U.S. Cl.
CPC .......... *H04N 23/667* (2023.01); *B60W 40/02* (2013.01); *B60W 40/08* (2013.01); *H04N 7/183* (2013.01); *H04N 7/188* (2013.01); *B60W 2420/403* (2013.01)

(58) Field of Classification Search
CPC ...... H04N 23/667; H04N 7/183; H04N 7/188; B60W 40/02; B60W 40/08; B60W 2420/42
See application file for complete search history.

(56) References Cited

U.S. PATENT DOCUMENTS

| | | | |
|---|---|---|---|
| 8,095,791 B2 | 1/2012 | Suwabe | |
| 2003/0147640 A1* | 8/2003 | Voss | G03B 17/24 |
| | | | 396/310 |
| 2014/0184858 A1* | 7/2014 | Yu | H04N 23/80 |
| | | | 348/241 |
| 2015/0287435 A1* | 10/2015 | Land | G06V 20/40 |
| | | | 386/241 |

(Continued)

FOREIGN PATENT DOCUMENTS

| | | |
|---|---|---|
| CN | 106685934 A | 5/2017 |
| CN | 110297711 A | 10/2019 |

OTHER PUBLICATIONS

Mardani et al., "Rank Minimization for Subspace Tracking from Incomplete Date", University of Minnesota, ICASSP 2013, Vancouver, Canada, May 18, 2013, URL: https://www.ece.rochester.edu/~qmateosb/pubs/orm/orm_ICASSP13.pptx, Fifteen (15) pages.

(Continued)

*Primary Examiner* — Michael Lee
(74) *Attorney, Agent, or Firm* — MARSHALL, GERSTEIN & BORUN LLP

(57) ABSTRACT

A system for opportunistic imaging includes an imaging device that generates data comprising a plurality of sequential image frames. The system also includes a control module that causes the imaging device to generate standard-resolution image frames at a standard-frame rate and a standard-resolution, such that there is a processing time lull between the generation of sequential standard-resolution image frames. The control module also causes the imaging device to generate one or more burst-resolution image frames at a burst-frame rate and a burst-resolution within the processing time lull.

20 Claims, 5 Drawing Sheets

(56) References Cited

U.S. PATENT DOCUMENTS

| | | | | |
|---|---|---|---|---|
| 2016/0323508 | A1* | 11/2016 | Ayalasomayajula | ........................ H04N 23/6812 |
| 2017/0085796 | A1* | 3/2017 | Rangam | ............. H04N 23/6811 |
| 2018/0217953 | A1 | 8/2018 | Cross et al. | |
| 2018/0367752 | A1* | 12/2018 | Donsbach | ................ G06N 3/08 |
| 2020/0186712 | A1* | 6/2020 | Högasten | ............. H04N 25/671 |
| 2023/0007282 | A1* | 1/2023 | Hu | ....................... H04N 19/172 |

OTHER PUBLICATIONS

Mercier et al., "Big Data and HPC collcation: Using HPC idle resources for Big Data Analytics", 2017 IEEE International Conference on Big Data (Bigdata), pp. 347-352.

* cited by examiner

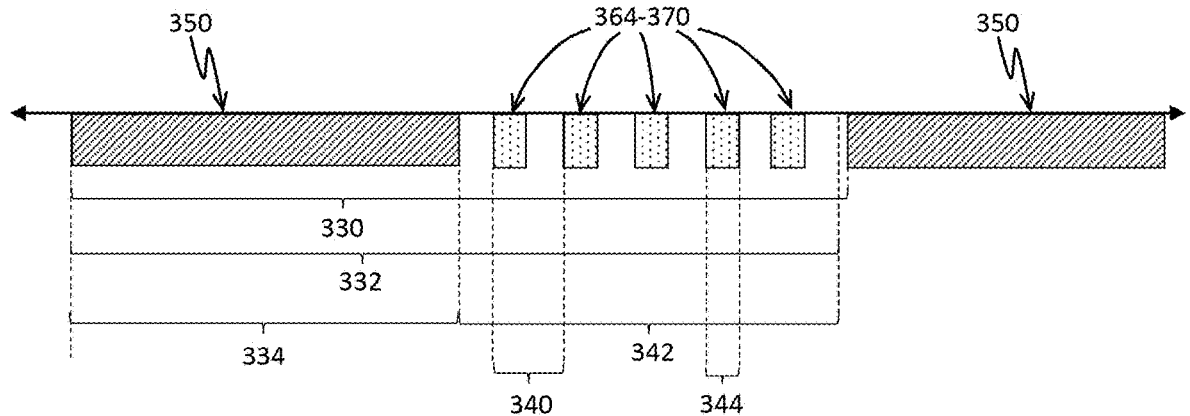
FIG. 3A
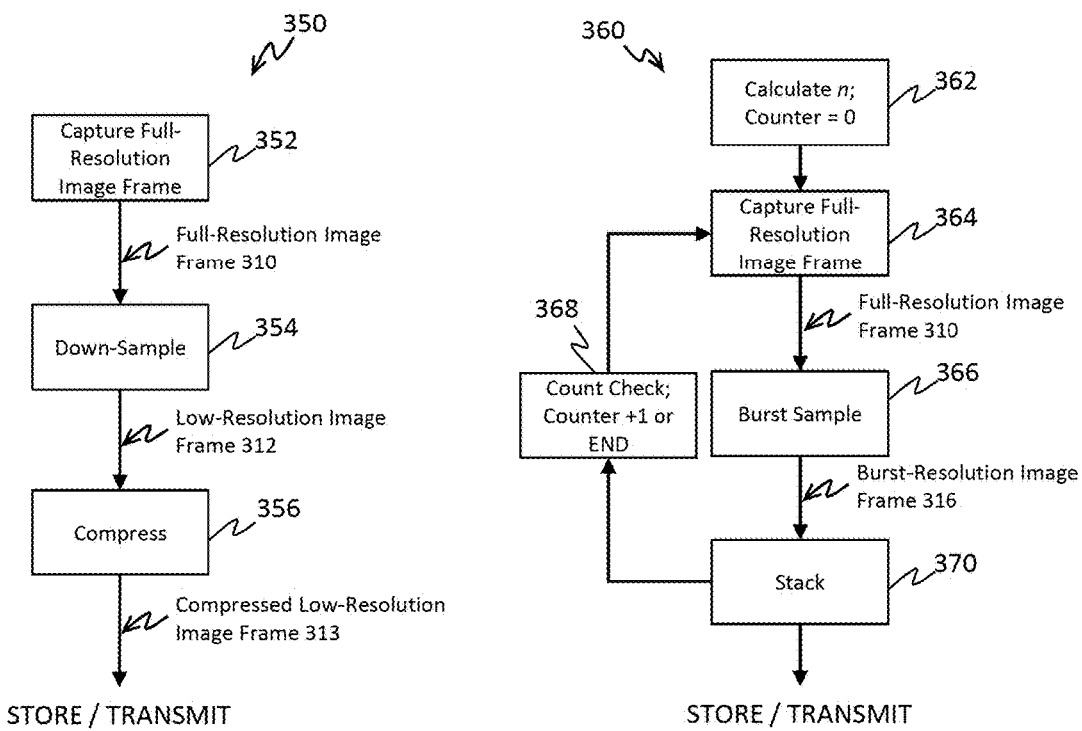
FIG. 3B
FIG. 3C

SYSTEM AND METHOD FOR OPPORTUNISTIC IMAGING

FIELD OF THE INVENTION

The invention relates to systems and methods for opportunistic imaging, particularly within an on-vehicle event detection and reporting system.

BACKGROUND

For commercial vehicle fleets, and in other non-commercial uses, on-vehicle event detection and reporting systems are known to use video cameras to record events of interest. For example, where a collision with the vehicle is detected, a video camera may record the collision for later analysis. Such video cameras, however, typically record at a lower frame rate or resolution than is desirable for more advanced and detailed analysis. For example, while the video camera may capture a collision with another vehicle, it may not sufficiently capture the license plate of the other vehicle, which may nevertheless be of interest.

Moreover, the frame rate of the video camera often inefficiently utilizes CPU processing time. For example, where the frame rate is 5 frames per second, most of the 0.2 seconds of processing time each second may be reserved for compressed image frame generation, but it may be that only 0.1 seconds is actually needed. This inefficiency is due to the needed processing time changing with the image captured, and thus the CPU not knowing in advance how much processing time will actually be used, therefore grossly over estimating.

Thus, the current methods for generating video data in this context are both insufficient and inefficient. There is a need in the art for systems and methods that overcome at least these deficiencies.

SUMMARY OF THE INVENTION

Systems and methods are therefore proposed for opportunistic imaging, particularly within an on-vehicle event detection and reporting system. In certain embodiments, the system includes an imaging device that generates video data comprising a plurality of sequential image frames from full-resolution image frames captured at a full-frame rate and an imager-resolution. The system also includes a control module that causes the imaging device to generate low-resolution image frames (or standard-resolution image frames) at a standard-frame rate and a low-resolution, such that there is a processing time lull between the generation of sequential low-resolution image frames. The control module also causes the imaging device to generate one or more burst-resolution image frames at a burst-frame rate and a burst-resolution within the processing time lull.

Since generating burst-resolution image frames via burst sampling of full-resolution image frames is computationally less intensive than generating low-resolution image frames from the full-resolution image frames, the system is able to fill in the processing lull to image the missing moments between the generation of low-resolution image frames, without using additional processing time resources beyond than those already reserved for generating the low-resolution image frames. Moreover, corresponding image frames, at up to the imager-resolution, may be reconstructed from the burst-resolution image frames such that the full-resolution image frames are effectively captured. These reconstructed image frames can also be reconstructed on-demand rather than in real-time, further saving computing resources. In some embodiments, a wobbly mount for the imaging device is particularly useful for capturing the burst image frames, which may be used for vibration sensing, super-resolution imaging and/or other advanced downstream processing.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A is a schematic diagram illustrating control operations according to one or more aspects of at least one embodiment.

FIGS. 3B-3C are flow chart illustrating exemplary control operations in accordance with one or more aspects of at least one embodiment;

DESCRIPTION OF EXEMPLARY EMBODIMENTS OF THE INVENTION

Figure 1:
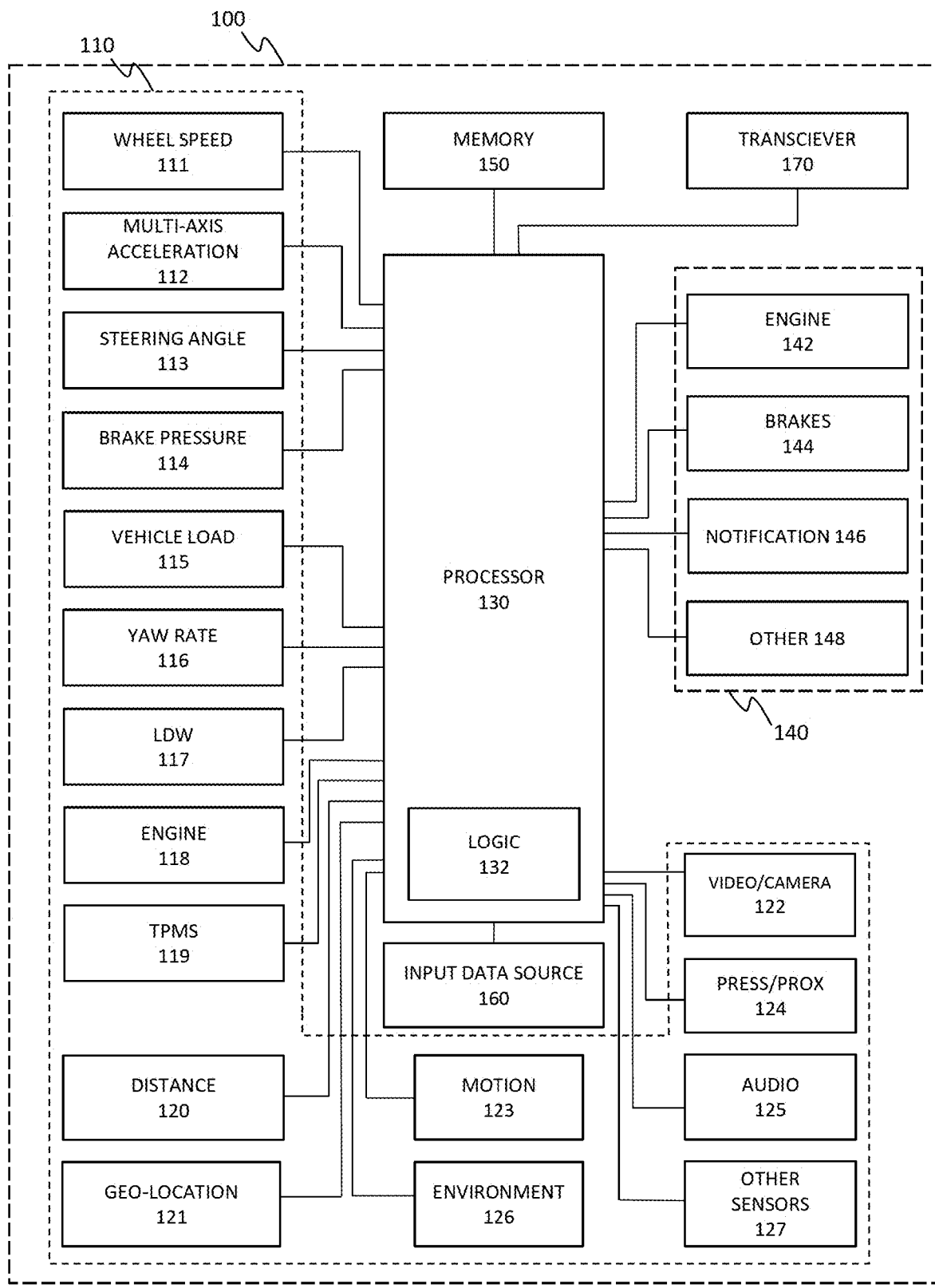
FIG. 1 is a schematic illustration of an exemplary system, in accordance with one or more aspects of at least one embodiment.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

Further in accordance with the practices of persons skilled in the art, aspects of one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, particularly with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The invention relates generally to systems and methods for opportunistic imaging. In certain embodiments, the invention may be implemented by an on-vehicle event detection and reporting system. The event detection and reporting system may be configured to collect and provide event-based data corresponding to detected driver and/or vehicle related events occurring during a driving excursion, or even outside of the driving excursion. The event-based data can include vehicle and/or driver related data collected from components of, or components interacting with, the event detection and reporting system, including but not limited to vehicle devices, sensors and/or systems. It will be understood that, while aspects and embodiments are occasionally described herein in terms of the driver, or in terms of being driver related, such aspects and embodiments are also generally applicable to passengers in lieu of or in addition to drivers, except as will be apparent to those of ordinary skill.

The components may include one or more driver facing cameras configured such that the field of view of the camera(s) captures a view the driver of the vehicle, and/or a view of other areas of the cabin, such as the driver controls of the vehicle while driving and non-driver passenger areas. Other cameras may be configured to capture other scenes relative to the vehicle, including but not limited to scenes in front of the vehicle, behind the vehicle, to either side of the vehicle, etc.

The components may further include vehicle devices, sensors and/or systems configured to provide non-video data, including non-video event-based data corresponding to driver and/or vehicle related events. Such components may include one or more microphones, independent or in connection with the cameras, configured to capture audio recordings of areas of the cabin and/or other vehicle areas (e.g., engine noise, etc.).

Accordingly, the event detection and reporting system can detect, in real time, the driver and/or vehicle related events from the collected event data. The event data therefore can include data from which events can be detected will be appreciated, but can also include data that corresponds to the detected event but is not used to detect the event. The events and/or the event data can be recorded, stored, reported to, collected by, or otherwise communicated internally and/or externally by the event detection and reporting system Examples of events that may be detected and/or reported to/collected by the event detection and reporting system include but are not limited to: safety events, for example and without limitation, excessive acceleration, excessive braking, exceeding speed limit, excessive curve speed, excessive lane departure, lane change without turn signal, loss of video tracking, LDW system warning, following distance (i.e., headway) alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc. Non-safety events may also include theft events, for example and without limitation, the presence of an unauthorized occupant accessing the vehicle, etc.

The event detection and reporting system may use event data collected directly from vehicle devices, sensors, and/or systems, which may include event data collected from an analysis of vehicle video, to generate event datasets that correspond in time with one or more detected events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames (e.g. from other cameras) whose timelines span or overlap the time when the event was detected/collected (in these scenarios, the time may be calculated based on the video frame or frames from which the event object was derived). The event detection and reporting system may be further configured to store one or more records of the detected events and/or the data sets generated in association therewith.

The event detection and reporting system may further be configured to control one or more vehicle systems in response to detected events. Examples of such control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume autonomous control, etc.), and alerting remote locations/devices (e.g., backend servers, dispatch center computers, mobile devices, etc.) of detected events. A variety of corrective actions may be possible and multiple corrective actions may be initiated at the same time. Accordingly, in at least some embodiments, the invention relates to the control of vehicle systems based on the vehicle and/or driver related data.

Referring to FIG. 1, by way of overview a schematic block diagram is provided illustrating details of an event detection and reporting system 100 configured to be used in accordance with one or more embodiments. The event detection and reporting system 100 may be adapted to detect a variety of operational parameters and conditions of the vehicle and the driver's interaction therewith (i.e., event-based data, etc.) and, based thereon, to determine if a driving and/or vehicle event has occurred (e.g., if one or more operational parameter/condition thresholds has been exceeded). The data related to detected events (i.e., event-based data or data sets) may then be stored and/or transmitted to a remote location/device (e.g., backend server, dispatch center computer, mobile device, etc.), and one or more vehicle systems can be controlled based thereon.

The event detection and reporting system 100 may include one or more devices or systems 110 for providing vehicle and/or driver related data, including data indicative of one or more operating parameters or one or more conditions of a commercial vehicle, its surroundings and/or its cabin occupants. The event detection and reporting system 100 may, alternatively or additionally, include a signal interface for receiving signals from the one or more devices or systems 110, which may be configured separate from system 100. For example, the devices 110 may be one or more sensors, such as but not limited to, one or more wheel speed sensors 111, one or more acceleration sensors such as multi-axis acceleration sensors 112, a steering angle sensor 113, a brake pressure sensor 114, one or more vehicle load sensors 115, a yaw rate sensor 116, a lane departure warning (LDW) sensor or system 117, one or more engine speed or condition sensors 118, and a tire pressure (TPMS) monitoring system 119. The event detection and reporting system 100 may also utilize additional devices or sensors, including for example a forward/lateral/rear distance sensor 120 (e.g., radar, lidar, etc.) and/or a geo-location sensor 121. Additional sensors for capturing driver related data may include one or more video sensors 122 and/or motion sensors 123, pressure or proximity sensors 124 located in one or more seats and/or driver controls (e.g., steering wheel, pedals, etc.), audio sensors 125, or other sensors configured to capture driver related data. The event detection and reporting system 100 may also utilize environmental sensors 126 for detecting circumstances related to the environment of the driving excursion, including for example, weather, road conditions, time of day, traffic conditions, etc. (i.e., environment-based data). Other sensors 127, actuators and/or devices or combinations thereof may be used or otherwise provided as well, and one or more devices or sensors may be combined into a single unit as may be necessary and/or desired.

The event detection and reporting system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired value, so as to detect one or more driver and/or vehicle related events.

The processor 130 may also include one or more outputs for delivering a control signal to one or more vehicle control systems 140 based on the detection of the event(s) and/or in response to vehicle and/or driver related data. The control signal may instruct the systems 140 to provide one or more types of driver assistance warnings (e.g., warnings relating to braking, obstacle avoidance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation). A variety of corrective actions may be possible and multiple corrective actions may be initiated at the same time. Such corrective actions need not be contemporaneous with detected events and/or event data, and may, additionally or alternatively, be responsive to one or more historical records of detected events and/or event data.

The vehicle control components may include brake light(s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems 148 may also be controlled in response to detected events and/or event data.

The event detection and reporting system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The event detection and reporting system 100 may also include a source of vehicle-related input data 160, which may be indicative of a configuration/condition of the commercial vehicle and/or its environmental circumstances (e.g., road conditions, geographic area conditions, etc.). The processor 130 may sense or estimate the configuration/condition and/or the environmental circumstances of the vehicle based on the input data, and may select a control tuning or control sensitivity setting based on the vehicle configuration/condition and/or environmental circumstances. The processor 130 may compare the operational data received from the sensors 110 to the information provided by the control tuning.

In addition, the event detection and reporting system 100 may be operatively coupled with one or more driver facing imaging devices, shown for simplicity and ease of illustration as a single driver facing camera 122 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 122 to record images of the roadway ahead of the vehicle. Such cameras may, for instance, indicate proximity to objects, the roadway verge, etc.

In some embodiments, driver related data can be collected directly using the driver facing camera 122, such driver related data including head position, eye gaze, hand position, postural attitude and location, or the like, within the vehicle. In addition, driver identity and/or presence can be determined based on facial recognition technology, body/posture template matching, and/or any other technology or methodology for making such determinations by analyzing video data.

In operation, the driver facing camera 122 may video data of the captured image area. The video data may be captured on a continuous basis, or in response to a detected event. Such data may comprise a sequence of video frames with separate but associated sensor data that has been collected from one or more on-vehicle sensors or devices, as detailed herein.

The event detection and reporting system 100 may also include a transmitter/receiver (transceiver) module 170 such as, for example, a radio frequency (RF) transmitter including one or more antennas for wireless communication of data and control signals, including control requests, event-based data, style-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into event-based data representative of higher-level vehicle and/or driver related data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events that can be monitored for and detected by the event detection and reporting system 100, and should not be understood as limiting in any way.

The event detection and reporting system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In at least some embodiments, the event detection and reporting system 100 of FIG. 1 is configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the process steps described herein. In some embodiments, hard-wired circuitry may be used in place of or in combination with software instructions to implement the invention. Thus, implementations of the example embodiments are not limited to any specific combination of hardware circuitry and software.

Figure 2:
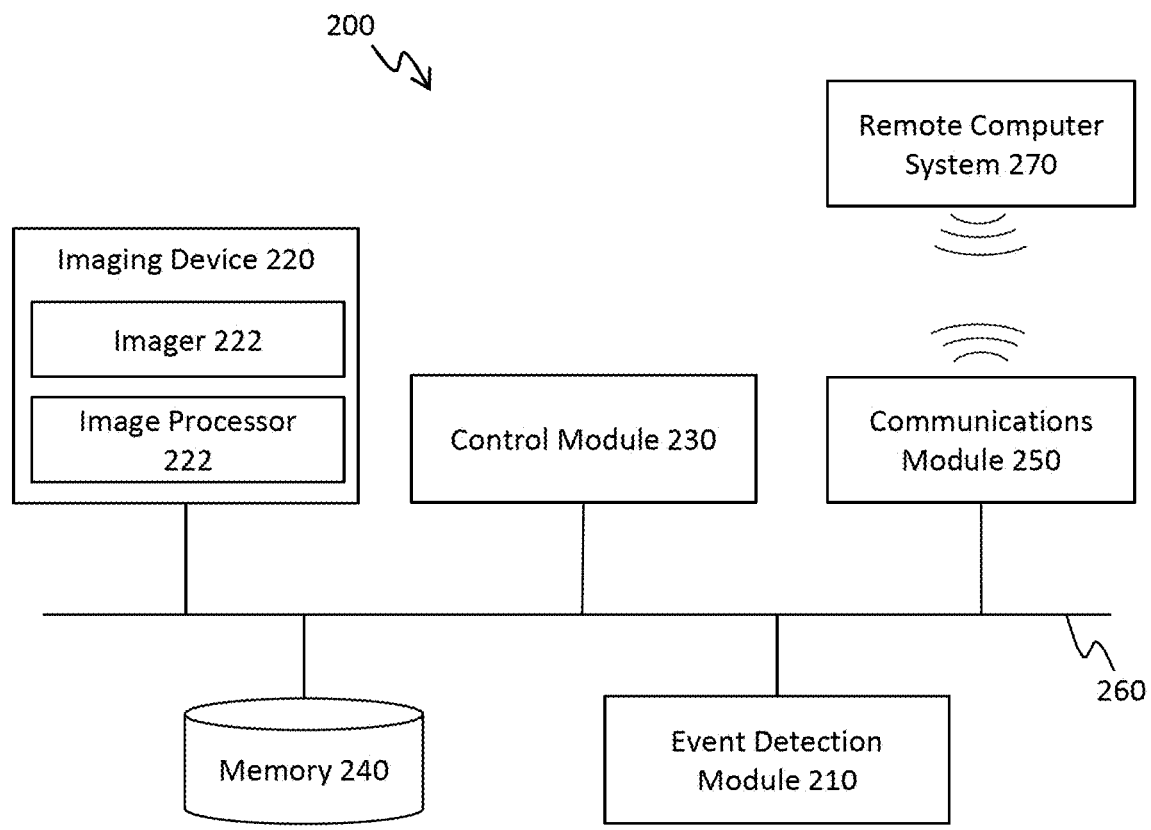
FIG. 2 is a block diagram that illustrates an exemplary system architecture, in accordance with one or more aspects of at least one embodiment.

FIG. 2 is a schematic block diagram depicting an exemplary system architecture 200 for opportunistic imaging, in accordance with at least one embodiment. The system architecture may be implemented via the event detection and reporting system 100 of FIG. 1, and may include one or more functional modules. The functional modules may be embodied by one or more processors, alone or in combination with other system components, executing one or more software applications so as to configure the one or more processors to implement the described functions, and/or otherwise cause the implementation of such functions via one or more other system components, alone or in tandem.

The system architecture 200 may include an event detection module 210, an imaging device 220, a control module 230, a memory 240 and a communications module 250, each operatively coupled to at least one data bus 260 for the communication of data and/or other signals therebetween. In at least one embodiment, the system architecture 200 further includes a remote computer system 270 in communication with the communications module 250.

The event detection module 210 may include one or more components of the event detection and reporting system 100 configured to detect driver and/or vehicle related events occurring during or outside a driving excursion. For example, the event detection module 210 may include the processor 130 and the one or more devices or systems 110 that provide vehicle and/or driver related data from which the processor 130 detects one or more driver and/or vehicle related events. The event detection module 210 may be configured to generate an event detection signal upon the detection of a vehicle and/or driver related event.

The imaging device 220 may be configured to generate video data capturing the vehicle environment, and may include one or more of: the forward facing camera and the driving facing camera of the event detection and reporting system 100 of FIG. 1, or any other appropriately configured camera. The video data may comprise a series of image frames generated according to one or more one or more frame rates, as shown in FIG. 3A. The image frames may be timestamped, or their respective order otherwise indicated, via frame metadata.

The imaging device 220 may include an imager 222 configured to capture full-resolution image frames 310 at an imager resolution. The imager resolution may be, for example, 1280×720 pixels. The imager 222 may further be configured to capture the full-resolution images at a full-frame rate, as well as other lower frame rates. The imager frame rate thus corresponds to a maximum frame rate at which the imager 222 can capture images.

The imaging device 220 may further include an image processor 224 operatively coupled to the imager 222 and configured to process the full-resolution image frames 310. The image processor 224 may be a CPU or other appropriately programmed processor. For example, the image processor 224 may be a dedicated processor of the imaging device 220, the processor 130 of the event detection and recordation system 100, and/or any other appropriately programmed processor.

The image processor 224 may be configured to down-sample or sub-sample the full-resolution image frames 310 so as to generate low-resolution image frames 312 at a low-resolution according to a normal image processing operation 350 (FIG. 3B). The low-resolution may be, for example, 640×360 pixels, 320×180 pixels, or any other resolution lower than the imager resolution. Accordingly, the file size of the full-resolution image may, for example, be on the order of 2 MB, whereas the file size of the low-resolution image may on the order of 200 KB.

The image processor 224 may further compress the low-resolution image frames 312 to generate compressed low-resolution image frames 313. The low-resolution image frames 312 may be compressed via JPEG compression techniques (e.g., spatial frequency-based compression). The compression ratio is preferably high, such that the file size of the compressed low-resolution image frame 313 is on the order of 90% of its uncompressed size. Accordingly, the compressed low-resolution image frame 313 may, for example, have a file size on the order of 20 KB. High spatial frequency image components may be lost by the normal image processing operation 350, which may render image details (e.g., license plate text, etc.) illegible. The compression may further be such that the low-resolution image frames 312 can be reconstructed from the compressed low-resolution image frames 313. For instance, an uncompressed 640 by 360 pixel image may have a file size of 200 KB, a compressed version thereof may be reduced in size by 90% to 20 KB, and a reconstructed (from the compressed, small, 20 KB) file may be again 640 by 360 pixels—though with fewer high frequency details than the original uncompressed low-resolution image frame. Thus, a small amount of data encodes an image, albeit with a (tuneable) tradeoff between quantity and quality.

The image processor 224 may also be configured to burst-sample the full-resolution image frames 310 so as to generate burst-resolution image frames 314 at a burst-resolution according to a burst image processing operation 360 (FIG. 3C). The burst-sampling may be pixel sampling at a fraction of the imager resolution, such that the file size for the burst-resolution image frames 314 may be on the order of the low-resolution image frames 312 (e.g., 200 KB) to the compressed low-resolution image frames 313 (e.g., 20 KB).

The burst-sampling may be spatially random, such that the full-resolution image frames 310 can be reconstructed from the burst-resolution image frames 314. Accordingly, in at least some embodiments, the burst-sampling may be done according to compressive sensing techniques.

The control module 230 may be configured to control the imaging device 220 to generate video data in accordance with the normal image processing operation 350 (FIG. 3B) and/or the burst image processing operation 360 (FIG. 3C). Such video data may be generated in response to the event detection signal, or independent thereof (e.g., on a continuous or semi-continuous basis). The control module 230 may be partially or fully embodied in one or more appropriately programmed processors, including the image processor 224 and/or any other processor.

An exemplary control will now be discussed with reference to FIGS. 3A-3C. FIG. 3A is a processing time chart schematically illustrating aspects of the control methods of FIG. 3B-3C.

Turning to FIG. 3C, in accordance with the normal image processing operation 350 (FIG. 3B), the control module 230 may control the imaging device 220 to generate compressed low-resolution images at a standard-frame rate 330. The standard-frame rate 330 may be a fraction of the full-frame rate. For example, the standard-frame rate 330 may be 5 frames per second, whereas the full-frame rate may be 20-30 frames per second. Continuing with the example, the imaging device 220 may be therefore controlled such that every 0.2 seconds, a new full-resolution image frame 310 is captured and processed to generate a corresponding compressed low-resolution image frame 313 therefrom.

FIG. 3B is flow-chart that illustrates an exemplary control process for the normal image processing operation 350. It will be understood that the normal image processing operation 350 may be repeated at the standard-frame rate 330 such that a series of compressed low-resolution images (i.e., video data) may be generated.

At step 352, the imager 222 may capture a full-resolution image frame 310 and transmit the full-resolution image frame 310 to the image processor 224 for processing. The full-resolution image frame 310 may, for example, be of the vehicle environment. The full-resolution image frame 310 may be captured at the imager resolution, which may be, for example, 1280×720 pixels. The file size of the full-resolution image may be, for example, 2 MB.

At step 354, the image processor 224 may down-sample or sub-sample the full-resolution image frame 310 so as to generate the low-resolution image frame 312. The low-resolution image frame 312 may be generated at the low-resolution, which may be, for example, 640×360 pixels, 320×180 pixels, or any other resolution lower than the imager resolution. The down-sampling or sub-sampling therefore results in a reduced file size for the low-resolution image frame 312, which may on the order of 200 KB.

At step 356, the image processor 224 may compress the low-resolution image frame 312 to generate the compressed low-resolution image frame 313. Such compression may be via JPEG compression techniques (e.g., spatial frequency based compression). The compression ratio is preferably high, such that the file size of the compressed low-resolution image frame 313 is on the order of 90% of its uncompressed size. The compressed low-resolution image frame 313 may, for example, have a file size on the order of 20 KB.

As is known in the art, the compression may be such that the compressed low-resolution image frames 313 may be decompressed so as to reconstruct an approximation of the original low-resolution image frame—or a reconstructed image frame whose quality can range all the way up to the original low-resolution image, with no loss of detail when no compression is used (that is, the original low-resolution image is expressed in a different manner when compression is applied, but the level of compression is zero), and less detail when compression is applied. However, a result of the normal image processing operation 350 is that high spatial frequency image components may be lost, which may render image details (e.g., license plate text, etc.) illegible. The control module 230 may therefore also control the imaging device 220 according to the burst image processing operation 360, so as to generate burst-resolution image frames 314 that can be reconstructed to the full-resolution image frames 310. The burst image processing operation 360 can also be done without occupying additional processing time of the image processor 224 via opportunistic image processing.

Turning back to FIG. 3A, the control module 230 may control the imaging device 220 to execute the normal image processing operation 350 according to the standard-frame rate 330 (e.g., at every 0.2 seconds). The control module 230 may accordingly reserve processing time for the normal image processing operation 350, i.e., a reserved processing time 332, which corresponds to computing cycles of the image processor 224 reserved for the normal image processing operation 350. In at least some embodiments, the reserved processing time 332 may begin at or just prior to scheduled receipt of the full-resolution image that starts the normal image processing operation 350, and may end just prior to the start of the next scheduled normal image processing operation 350.

The reserved processing time 332 may be greater than an actual processing time 334 that it takes the image processor 224 to complete the normal image processing operation 350. The actual processing time 334 may vary with each image frame based on the content of the captured image—which is generally unpredictable. The reserved processing time 332 may be a multiple of the longest actual processing time 334 expected for images of vehicle surroundings. In some embodiments, the reserved processing time 332 is twice the longest actual processing time 334 expected, but other multiples may be used. In at least one embodiment, the multiple may be selected such that it ensures the normal image processing operation 350 is complete before the next normal image processing operation 350 begins.

A processing time lull 342 may result from the reserved processing time 332 being greater than the actual processing time 334. The processing time lull 342 may span from the end of the actual processing time 334 to the end of the reserved processing time 332. Alternatively, the processing time lull 342 may span from a current time after the end of the actual processing time 334 to the end of the reserved processing time 332. The processing time lull 342 may also span to just before the end of the reserved processing time 332. Under the normal image processing operation 350, the image processor 224 may be idle during the processing time lull 342.

The control module 230 may be configured to utilize the processing time lull 342 to execute the burst image processing operation 360 (FIG. 3C), and thereby generate one or more burst-resolution image frames 314. The burst-resolution image frames 314 may be generated at a burst-frame rate 340 that is greater than the standard-frame rate 330. In some embodiments, the burst-frame rate 340 can be twice the standard-frame rate 330 or more, up to the full-frame rate. For example, the burst-frame rate 340 may be 25-30 frames per second. Continuing with the example of 25 frames per second, the imaging device 220 may be therefore controlled such that every 0.04 seconds within the processing time lull 342, a new full-resolution image frame 310 is captured and processed to generate a corresponding burst-resolution image frame 314 therefrom.

The burst-frame rate 340 and the burst-resolution may be selected so as to optimize a burst processing time 344 in order to enable the generation of a desired quantity of burst-resolution image frames 314 at the burst-resolution that is sufficient for downstream processing objectives (e.g., image reconstruction). The burst processing time 344 reflects the computing cycles that it takes the image processor 224 to complete the burst image processing operation 360 for a single image frame.

FIG. 3C is flow-chart that illustrates an exemplary control process for the burst image processing operation 360.

At step 362, the control module 230 may calculate the number n of burst-resolution image frames 314 to generate within the processing time lull 342. The number n of burst-resolution image frames 314 to generate may be calculated based on the burst-frame rate 340 and the duration of the processing time lull 342, both of which may be known. For example, where the processing time lull 342 is 0.1 seconds (i.e., half of a 0.2 second or 5 frames per second standard-frame rate 330), and the burst-frame rate 340 is 25 frames per second (i.e., one burst-resolution image frame 314 every 0.04 seconds), the number n of burst resolution frames to generate may be two. A counter for n may also be set to 0.

At step 364, the imager 222 may capture the full-resolution image and transmit the full-resolution image frame 310 to the image processor 224. The full-resolution image frame 310 may, for example, be of the vehicle environment. The full-resolution image frame 310 may be captured at the imager resolution, which may be, for example, 1280×720 pixels. The file size of the full-resolution image may be, for example, 2 MB.

At step 366, the image processor 224 may burst-sample the full-resolution image frame 310 so as to generate the burst-resolution image frame 314. The burst-resolution image frame 314 may be generated at the burst-resolution, which may be less than the imager resolution and/or the low-resolution. In particular, the burst-sampling may be pixel sampling at a fraction of the imager resolution, such that the file size for the burst-resolution image frames 314 are on the order of the low-resolution image frames 312 (e.g., 200 KB) or the compressed low-resolution image frames 313 (e.g., 20 KB) without compression. The burst-sampling therefore results in a reduced file size for the burst-resolution image frame 314 without compression.

Figure 3D:
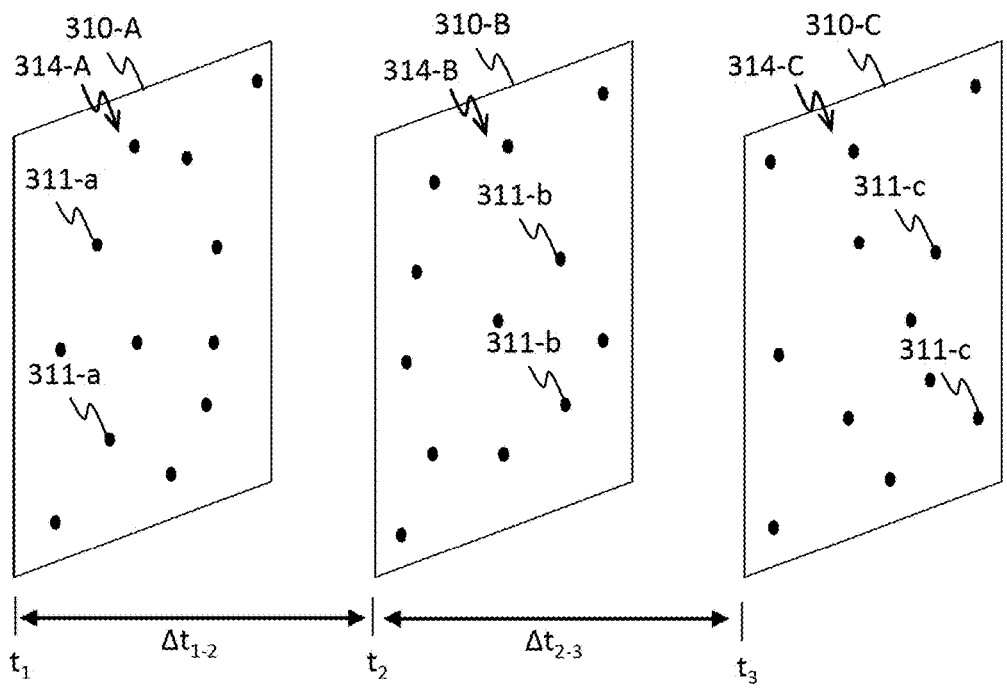
FIG. 3D is a schematic diagram illustrating control operations according to one or more aspects of at least one embodiment.

FIG. 3D schematically illustrates aspects of exemplary burst-sampling for an example burst image processing operation 360, where the number n of burst-resolution image frames 314 to generate is three. The three full-resolution image frames 310-A, 310-B, 310-C are acquired at times $t_1$, $t_2$, $t_3$ reflecting periods $\Delta t_{1-2}$ and $\Delta t_{2-3}$ corresponding to the burst-frame rate 340. The period $\Delta t$ may be constant or variable, but is preferably constant according to the burst-frame rate 340.

The burst-sampling may include sampling each full-resolution image frame 310 at various pixel locations 311 (e.g., row and column), with the number of pixel locations 311 sampled per full-resolution image corresponding to the burst-frame resolution. For example, where the full-resolution image frame 310 has 1280×720 pixels, the burst-frame resolution of 10% results in the sampling of 92,160 pixel locations 311. Other burst-frame resolutions may be utilized.

The burst-resolution image frame 314 comprises the sampled pixels of the full-resolution image frame 310. For example, the burst-resolution image frames 314-A, 314-B, 314-C, corresponding to full-resolution image frames 310-A, 310-B, 310-C, are the pixels at the sampled pixel locations 311-*a*, 311-*b*, 311-*c* of full-resolution image frames 310-A, 310-B, 310-C.

The pixel locations 311 sampled at each time $t_1$, $t_2$, $t_3$ are preferably non-overlapping. That is, the same pixel location 311 is not sampled more than once for any given burst image processing operation 360. The burst-resolution and/or burst-frame rate may be set so as to ensure non-overlapping pixels in the burst-sampling. For example, where the number n of burst-resolution image frames 314 to be generated is 3, the maximum burst-resolution is 33% of the imager-resolution, and may be set accordingly at or below the 33%. It will be understood that either can be set as a function of the other, and that one or both may be set to optimize processing objectives.

The pixel locations 311 according to the burst-sampling are also preferably spatially random. That is, the pixel locations 311 are randomly selected, and are not selected according to a regular spatial interval (e.g., every m-th pixel). The random sampling of non-overlapping pixel locations 311 (i.e., the burst-sampling) results in the generation of the burst-resolution image frame 314. The resulting burst-resolution image frame 314 is such that reconstruction of a reconstructed image frame, of up to the imager-resolution, from the burst-resolution image frame 314 is possible. In some embodiments, compressive sensing techniques may be used for such image reconstruction.

It will be understood that any technique for image reconstruction may be utilized, including, for example, compressive sensing, compressed sensing, compressed sampling, and compressive sampling techniques, or the like, in which up to the full-resolution images can be reconstructed from the burst-resolution image frame data. Accordingly, in at least some embodiments, the burst-resolution image frames 314 may be generated according to corresponding techniques.

The pixel locations 311 may be set according to a look-up table, or other reference, stored in the memory 240. The look-up table may identify the pixel locations 311 to be sampled at each time $t_1$, $t_2$, $t_3$, and such relationship can be randomly generated in advance such that the burst-sampling is spatially random. In some embodiments, the look-up table may comprise a series of entries, each of which identifies a set of pixel locations 311. The number of entries and the size of the sets may be such that all the available pixel locations 311 for the full-resolution image are represented in the look-up table. The look-up table entries may further be utilized in looped succession to determine the burst-sampling pixel locations 311 for each successive full-resolution image frame 310 that is received for burst image processing. In this manner, the burst-sampling may be both random within each frame and at non-overlapping locations as between frames, while also being computationally efficient. The look-up table, or portions thereof, may also be used in the image reconstruction as a shared key between the randomly sampled image acquisition and the image reconstruction.

Returning to FIG. 3C, at step 368, the counter may be checked. If the counter is less than n, the counter may be increased by 1. The control process may thereafter revert to step 364 to capture another full-resolution image frame 310 for processing. If the counter has reached n, the control process may end with the n-th burst-resolution image frame 314 having been generated. The control process nevertheless continues to step 370.

At step 370, the burst-resolution image frames 314 may be combined with other burst-resolution image frames 314 into an image stack, which may be stored in the memory 240 and/or transmitted. The stacking of burst-resolution image frames 314 is possible because of the non-overlapping pixel locations 311— and involves compiling the pixels of the burst-resolution image frames 314 into a single image file. In some embodiments, where the pixel locations 311 of one burst-resolution image frame 314 would otherwise overlap with another in the stack, the more recent burst-resolution image frame 314 may replace the older one in a round-robin fashion. The image stack may therefore be stored and/or transmitted on-demand so as to contain the desired burst-resolution image frames 314.

Instructions for de-stacking the burst-resolution images may be stored in association with the stack, and may identify which pixel locations 311 belong to which burst-resolution image frame 314. Accordingly, for example, a first set of pixel locations 311-*a* may be identified as making up a first burst-resolution image frame 314-A of the stack, whereas a second set of pixel locations 311-*b* may be identified as making up a second burst-resolution image frame 314-B of the stack. In some embodiments, the look-up table may also include the instructions for de-stacking, or vice versa, as a shared key.

For example, the system may be set so that a maximum of 10 burst-resolution image frames can be stacked in round-robin fashion. Each burst-resolution image frame would therefore have random, non-overlapping pixel locations for 1/10th of the corresponding full-resolution image frame—and the full stack would include 10 such burst-resolution image frames, each comprising a corresponding set of pixel locations. In that case, the first set of pixel locations 311-*a* may be $S1=\{a_1, a_2, a_3, a_4, \ldots\}$, whereas the second set of pixel locations 311-*b* may be $S2=\{b_1, b_2, b_3, b_4, \ldots\}$, and so forth up to 10 sets of random, non-overlapping pixel locations, which are disjunct but together cover the entire image frame. When a given burst-resolution image frame is sampled according to the first set of pixel locations 311-*a*, the result is a set of pixel values, e.g., $S1'=\{a'_1, a'_2, a'_3, a'_4 \ldots\}$, at locations $\{a_1, a_2, a_3, a_4,\}$, and so on for each of the 10 sets of pixel locations. As shown in the set notation, the resulting sets of pixel values may each be respectively labeled as corresponding to the sets of pixel locations according to which those pixel values were sampled (e.g., $S1' \leftrightarrow S1$, $S2' \leftrightarrow S2$, and so on).

The de-stacking instructions may include this relationship in the form of the shared key, and may also include which pixel location set was used to generate which burst resolution image frame in the stack, such that the pixel values at the pixel locations for each burst-resolution image frame can be identified. In other words, because S1 and S1'↔S1 are known from the shared key to correspond to a first burst-resolution image frame, the pixel values for the first burst-resolution image frame, i.e., S1', can be determined from the stack as those pixel values at pixel locations S1 of the stack, and so on for the other burst-resolution image frames of the stack. These pixel values of the burst-resolution image frames can thereafter be used to reconstruct the image frame, as discussed herein.

It will be understood, however, that the burst-resolution image frames 314 need not be stacked for transmission, and may be transmitted individually. Moreover, partial stacks may be transmitted. In some embodiments, already transmitted burst-resolution image frames may be logged and this portion of the stack reused in situations where stack is to be transmitted mid-round-robin.

Returning now to FIG. 3A, the control module 230 may via execution of the burst image processing operation 360 opportunistically utilize the processing time lull 342 caused by the normal image processing operation 350 in order to generate burst-resolution image frames 314 via the burst image processing operation 360. Such an exemplary situation is shown in FIG. 3A, where the standard-frame rate 330 is shown as approximately 5 frames-per-second. The processing time lull 342 is therefore present in which 3 burst image frames are captured at the burst-frame rate 340 of approximately 30 frames-per-second.

It will be understood that, while FIG. 3A shows time gaps between some of the aforementioned durations, the control module 230 may control the processing to minimize such time gaps, or otherwise optimize the processing. For example, the burst image processing operation 360 may start immediately at the processing time lull 342, so that there is substantially no wasted time. As a further example, the burst-frame rate 340 and the burst-resolution may be selected to optimize the number n of burst-resolution image frames 314 that can be generated within the processing time lull 342, and/or to optimize the burst-resolution of the resulting burst-resolution image frames 314 for downstream processing objectives (e.g., image reconstruction). In some embodiments, the imager 222 may be configured to capture the full-resolution image frames 310 independent of whether image processor 224 is currently in use. Under such circumstances, the full-resolution image frame capture for the burst image processing operation 360 may begin while the image processor 224 is processing (i.e., down-sampling and/or compressing) the previous full-resolution image frame 310 for the normal image processing operation 350. In other words, step 364 of the burst image processing operation 360 (FIG. 3C) may begin during step 354 of the normal image processing operation 350 (FIG. 3B).

Returning now to FIG. 2, the control module 230 may further be configured to instruct the image processor 224 to communicate the generated video data (i.e., image frames) to the memory 240, where it may be retrievably stored. The memory 240 may include a long-term memory, which can be flash, SSD and/or any other non-volatile or long-term memory type, and/or a short-term memory, which can be DRAM, SRAM and/or any other type of volatile or other short-term memory.

The compressed low-resolution video data (i.e., the compressed low-resolution image frames 313), the low-resolution video data 312, and/or the burst-resolution video data (i.e., the burst-resolution image frames 314) may be stored in the memory 240. The burst-resolution video data may be stored as one or more stacks of burst-resolution frames 314 and/or as individual burst-resolution image frames 314. Moreover, instructions for de-stacking, decompressing and/or otherwise reconstructing the video data may be stored in association with the corresponding video data, as discussed herein.

Accordingly, the short-term memory may include a stack memory in which one or more burst-resolution image frames 314 may be temporarily stored prior to being compiled into a stack. The stack memory may be configured as a buffer for storing non-overlapping burst-resolution image frames 314. That is, where the pixel locations of one burst-resolution image frame 314 would otherwise overlap with another in the stack, the more recent burst-resolution image frame 314 may replace the older one in the stack memory.

In some embodiments, the video data may be stored with associated driver and/or vehicle related data, which may be captured along with the corresponding video data. For example, video data captured contemporaneously with sensor data can be stored in association with that sensor data. Moreover, the sensor data can be randomly and/or deterministically sampled, in order to reduce the amount of data stored in the memory 240.

In at least one embodiment, the video data may be captured on a continuous or semi-continuous basis. The short-term memory may also include a buffer memory configured to temporarily store the continuously captured video data. The control module 230 may, in response to the event detection signal, control the buffer memory to communicate the generated video data, or a portion thereof, to the long-term memory, where it may be retrievably stored. In some embodiments, the portion of the generated video data that is communicated from the buffer memory to the long-term memory in response to the event detection signal may correspond to a predetermined time period prior to the detected event. In this manner, video data preceding the detected event may be stored in the long-term memory in response to the event detection signal. Such event preceding video data may be low-resolution video data and/or burst-resolution video data generated in accordance with their respective image processing operations.

The video data may further be retrieved from the memory 240 for downstream processing, which may include, for example, image reconstruction. The term "image reconstruction," as used herein, refers to the process of reconstructing higher-resolution image frames from lower-resolution image frames. Accordingly, image reconstruction of the compressed low-resolution image frames 313 may include decompressing the compressed low-resolution image frames 313 to achieve the reconstructed low-resolution image frame. Moreover, image reconstruction of the stacked burst-resolution image frames 314 may include de-stacking the burst-resolution image frames 314, and using compressive sensing techniques, or the like, to achieve the reconstructed image frame with a resolution up to the imager-resolution of the full-resolution image frames 310 therefrom. Image reconstruction may also be used to reconstruct corresponding low-resolution images frames from the burst-resolution image frames 314, or to reconstruct corresponding image frames at any other intervening resolution. Moreover, image reconstruction can be done on-demand or in real-time.

The image reconstruction may be done via the processor 130 and/or another on-board processor (not shown). However, image reconstruction of the burst-resolution image frames 314 is slow and computationally intensive. Therefore, in some embodiments, image reconstruction of burst-resolution video data is preferably done at the remote computer system 270. Other downstream processing may also be done at the remote computer system 270.

Accordingly, the communications module 250 may be configured to transmit the video data to the remote computer system 270 for the downstream processing, including image reconstruction. In particular, the video data, e.g., the burst-resolution image frames 314, may be retrieved from the memory 240 and transmit to the remote computer system 270 where the video data can undergo such downstream processing.

In at least one embodiment, the remote computer system 270 may be configured to perform downstream processing, including acquiring further low-resolution video data from the burst-resolution video data. The further low-resolution video data may be in addition to the low-resolution video data acquired via the normal image processing operation 350. Acquiring the further low-resolution video data may include reconstructing the further low-resolution video data from the burst-resolution video data. Events occurring within the processing lull time may therefore be recorded for a more temporally detailed review. In at least one embodiment, at least the further low-resolution video data may be utilized to provide slow-motion playback at the low-resolution.

In at least one embodiment, the remote computer system 270 may be configured to perform downstream processing, including acquiring full-resolution video data from the burst-resolution video data. Acquiring the full-resolution video data may include reconstructing full-resolution video data from the burst-resolution video data. Events occurring within the processing lull time may therefore be recorded for a more spatially detailed review. For example, the low-resolution video data can be reviewed to broadly identify objects of interest (e.g., license plates, etc.) within a low-resolution image frame 312. However, since high spatial frequency image components may be lost by the normal image processing operation 350, details of the objects (e.g., license plate text, etc.) may be illegible from the low-resolution image frame 312. The reconstructed full-resolution video data (i.e., burst-resolution image frames 314 reconstructed to corresponding full-resolution image frames 310) may nevertheless capture the identified object in one or more of the associated processing time lulls 342. That reconstructed full-resolution video data can therefore be reviewed to determine the details of the object that are insufficiently legible via the low-resolution image frame 312. This can be done for object recognition, facial recognition, and/or the recognition/measurement of any detail captured by the full-resolution image but rendered insufficiently legible, precise, or otherwise recognizable in the low-resolution image frame 312.

In at least one embodiment, the remote computer system 270 may be configured to perform downstream processing, including the generation of super-resolution image frames 316 from the burst-resolution video data. The super-resolution image frames 316 may have a super-resolution that is greater than the full-resolution (e.g., on the order of twice the resolution). For example, super-resolution image frames 316 of approximately 2560×1440 pixels can be generated from full-resolution image frames of 1280×720 pixels. The super-resolution image frames 316 may be utilized to review hard-to-see features, e.g., badge numbers, vehicle identifying decals and other characteristics, etc., present in low-resolution or full-resolution image frames.

Figure 4A:
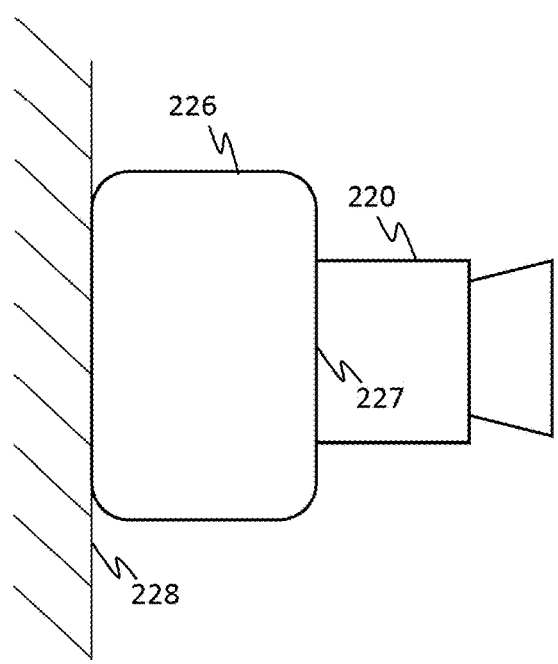
FIGS. 4A-4B are schematic diagrams illustrating aspects of the exemplary system according to at least one embodiment.

The generation of super-resolution image frames 316 may be done by taking advantage of image perturbations 420 between reconstructed full-resolution image frames 310. Accordingly, in some embodiments, the imaging device 220 is mounted on a wobbly mount 226. FIG. 4A illustrates an exemplary imaging device 220 mounted to a surface 228 via the wobbly mount 226, which may be made of elastomeric, adhesive and/or other appropriate material. The wobbly mount 226 is shown in FIG. 4A as a single solid homogeneous elastomer mounting the imaging device 220 to the surface 228.

Figure 4B:
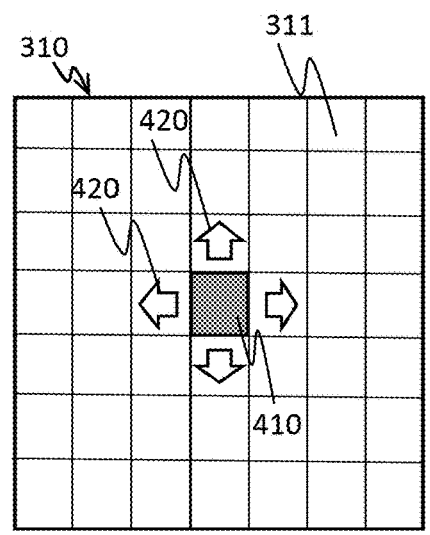

The wobbly mount 226 may be configured to allow for the image perturbations 420 required to generate the super-resolution images. FIG. 4B schematically illustrates such image perturbations 420 as having vertical and horizontal components by which an image 410 (i.e., one or more pixels) may be shifted from its previous location 311. Such shifting may be on the order of a few, e.g., one or so, pixel locations 311. That is, the image perturbation 420 may be such that the image 410 located at pixel location 311 (x, y) is shifted to (x+1, y−1) in the subsequent burst-image frame.

The remote computer system 270 may be configured to process the image perturbations 420 so as to interpolate image data for virtual pixel locations between the pixel locations 311 of the image frames. Such interpolation is known in the art and maybe applied to the full-resolution image frames 310 to generate the super-resolution image frames 316.

It is desirable in super-resolution image frame generation that the image perturbations 420 be confined as much as possible to the image plane. The wobbly mount 226 may thus be configured to favor tilt and shear over on-camera-axis compression, so as to facilitate the desired image perturbations 420. In some embodiments, the imaging device 220 may be mounted on a planar surface 227 that is in turn mounted to the surface 228 via one or more wobbly mounts 226 located at each corner of the planar surface 227. Such an arrangement facilitates the occurrence of tilting perturbations akin to the tilting motions of a vehicle with a suspension at each wheel.

In some embodiments, the wobbly mount 226 may be configured as a spring-mass-damper system. The typical vibration frequencies of the vehicle motion and/or engine vibration can accordingly be dampened via the wobbly mount 226 so as to stabilize the wobbly mount 226 in response to such frequencies, effectively eliminating image perturbations that would have otherwise resulted from such motion, while sufficiently allowing other vibration frequencies to cause the image perturbations that may be used for super-resolution image frame generation. The wobbly mount 226 can thus act as a filter that filters out undesired perturbations caused by the typical vibrations.

In some embodiments, the downstream processing may include using the burst image frames to detect vehicle vibration frequencies, e.g., for vehicle diagnostic, road condition analysis and/or event detection purposes, based on the rolling shutter effect. In particular, the downstream processing may analyze burst-resolution image frames 314 of known fixed objects, so as to detect the vibration of the fixed object. In particular, higher frequency motion of the fixed object may be captured by the burst-resolution video data due to the higher burst-frame rate 340. The rolling shutter effect may cause the fixed object to appear curved, torn or jagged when the burst-resolution image frames 314 are stacked. By comparing the amount of curvature, tear or jaggedness to an accurate model of the in-frame object, i.e., in which the in-frame object is not curved, torn or jagged as it is in the image, the degree of vibration resulting in the curvature, tear or jaggedness can be determined. The vehicle vibration frequencies can thereafter be determined from the vibration of the fixed object and the known image line sampling times (e.g., as an approximation of the vehicle vibration).

The remote computer system 270 may be configured for any one or any combination of the downstream processing described herein, or other downstream processing. In at least one embodiment, the remote computer system 270 may be part of or coupled to a backend server system configured to enable a user to review the video data described herein, alone or in combination with vehicle and/or driver related data, or data derived therefrom.

Figure 5:
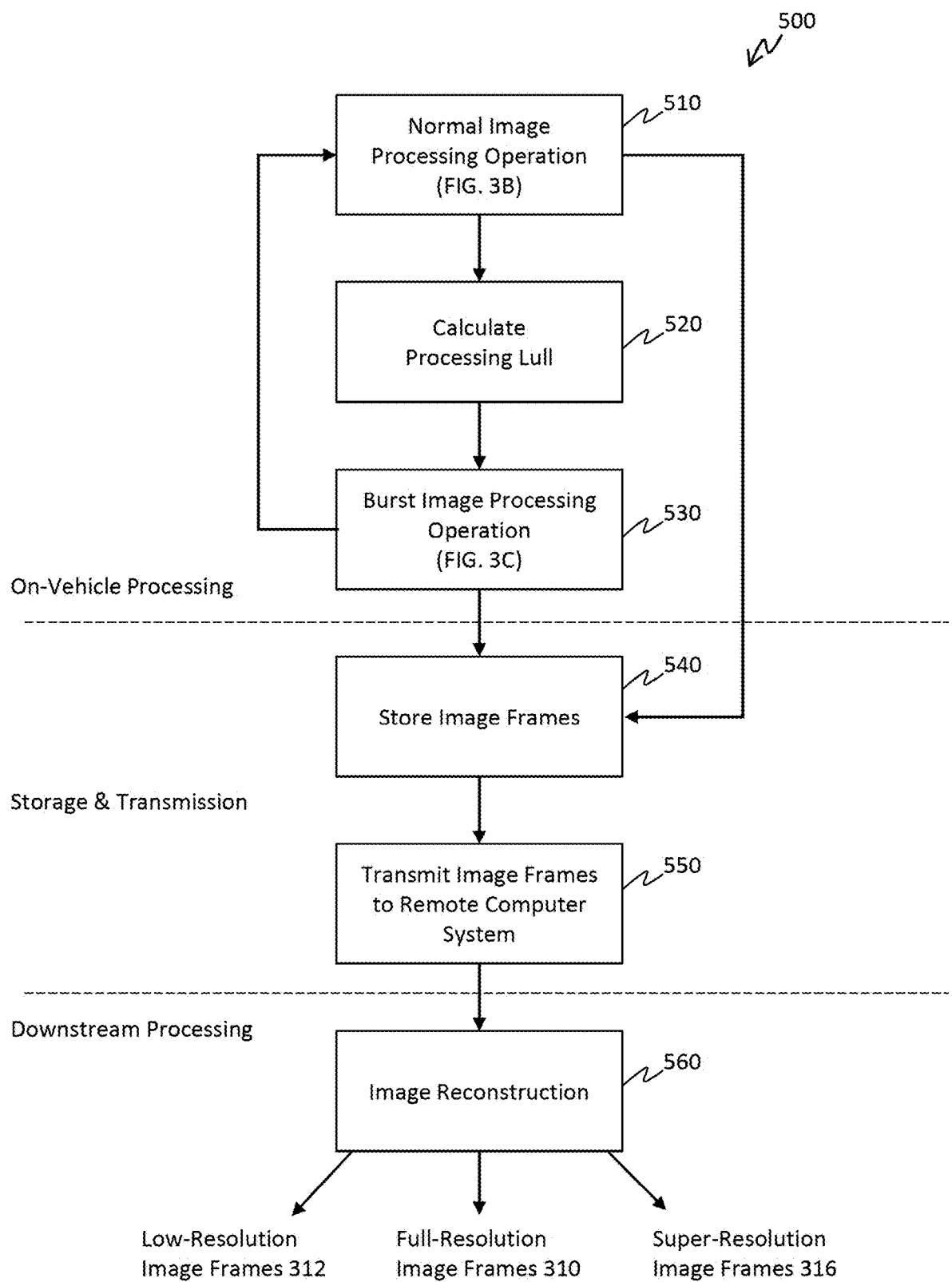
FIG. 5 is an exemplary flow-chart illustrating exemplary methods in accordance with one or more aspects of at least one embodiment.

Turning now to FIG. 5, an exemplary method 500 according to at least one embodiment is illustrated.

At step 510, the imaging device 220 may be controlled to generate a compressed low-resolution image frame 313 according to the normal image processing operation 350 (FIG. 3B). The normal image processing operation 350 may include capturing a full-resolution image frame 310 that is then processed by the image processor 224 to generate the low-resolution image frame 312 and/or the compressed low-resolution image frame 313. The normal image processing operation 350 may include reserving processing time 332 in excess of the actual processing time 334 that it takes the image processor 224 to generate the low-resolution image frame 312 and/or the compressed low-resolution image frame 313. The method 500 may proceed from step 510 to step 540 and/or to step 540.

At step 520, the control module 230 may calculate the processing time lull 342. The processing time lull 324 may be calculated based on the reserved processing time 332 and the actual processing time 334. For example, the processing time lull 324 may be from the end of the actual processing time 334 to the end of the reserved processing time 322. Alternatively, the processing time lull 324 may be based on the reserved processing time 332 and the current time. For example, the processing time lull 324 may be the remaining processing time from the current time until the end of the reserved processing time 332.

At step 530, the imaging device 220 may be controlled to generate one or more burst-resolution image frames 314 according to the burst image processing operation 360 (FIG. 3C). The burst image processing operation 360 may include capturing full-resolution image frames 310 that are then processed by the image processor 224 to generate the burst-resolution image frames 314. The burst image processing operation 360 may include stacking the burst-resolution image frames 314 generated.

The method 500 may proceed from step 530 to step 510, such that the normal image processing operation 350 may be repeated for subsequent image frames at the standard-frame rate 330. The method 500 may additionally or alternatively proceed from step 530 to step 540.

At step 540, the generated image frames 312, 313, 314 may be stored in the memory 240. The burst-image frames 314 may be stored image stacks. The generated image frames 312, 313, 314 may also be stored in the memory 240 with image reconstruction instructions, e.g., de-stacking instructions and/or de-compressing instructions, for reconstructing the generated image frames 312, 313, 314.

At step 550, the communications module 250 may transmit the generated image frames 312, 313, 314 to the remote computer system 270 for downstream processing. The burst-image frames may be communicated individually and/or as image stacks.

At step 560, the remote computer system 270 may receive the transmitted image frames 312, 313, 314 and perform downstream processing on them. The downstream processing may include image reconstruction. The image reconstruction may include reconstructing low-resolution image frames 312, full-resolution image frames 310 and/or super-resolution image frames 316 from the burst-resolution image frames 314. The remote computer system 270 may further utilize the reconstructed image frames for event monitoring via the event detection and reporting system 100.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

The invention claimed is:

1. A system for opportunistic imaging, comprising:
an imaging device configured to generate data comprising a plurality of sequential image frames; and
a control module configured to:
cause the imaging device to generate standard-resolution image frames at a standard-frame rate and a standard-resolution, wherein the standard frame rate delineates a reserved processing time that includes a processing time lull that the control module has reserved for processing the standard-resolution image frames but in which the control module is not processing the sequential standard-resolution image frames; and
cause the imaging device to generate one or more burst-resolution image frames at a burst-frame rate and a burst-resolution within the processing time lull, wherein the burst-resolution image frames are generated via pixel sampling at a fraction of the standard resolution.

2. The system of claim 1, wherein the burst-resolution image frames are generated such that corresponding reconstructed image frames can be generated, at the standard-resolution and higher, from the burst-resolution image frames via image reconstruction.

3. The system of claim 1, wherein the processing time lull is idle time between the image processing time reserved by the control module for generating the standard-resolution image frames.

4. The system of claim 1, wherein each of the burst-resolution image frames are generated by pixel sampling corresponding image frames at random, non-overlapping, pixel locations.

5. The system of claim 4, wherein the random, non-overlapping, pixel locations are stored in a predetermined look-up table and each burst-resolution image frame is associated with a key to the lookup table.

6. The system of claim 1, wherein the imaging device is mounted to a vehicle surface via a wobbly mount.

7. A method for opportunistic imaging, comprising:
generating, via an imaging device, sequential standard-resolution image frames at a standard-frame rate and a standard-resolution, wherein the standard frame rate delineates a reserved processing time that includes a processing time lull that a control module has reserved for processing the standard-resolution image frames but in which the control module is not processing the standard-resolution image frames; and
generating, via the imaging device, sequential burst-resolution image frames at a burst-frame rate and a burst-resolution within the processing time lull, wherein the burst-resolution image frames are generated via pixel sampling at a fraction of the standard resolution.

8. The method of claim 7, wherein the burst-resolution image frames are generated such that corresponding reconstructed image frames can be generated, at the standard-resolution and higher, from the burst-resolution image frames via image reconstruction.

9. The method of claim 7, wherein the processing time lull is idle time between the image processing time reserved for generating the standard-resolution image frames.

10. The method of claim 7, wherein each of the burst-resolution image frames are generated by pixel sampling corresponding image frames at random, non-overlapping pixel locations.

11. The system of claim 10, wherein the random, non-overlapping pixel locations are stored in a predetermined look-up table and each burst-resolution image frame is associated with a key to the lookup table.

12. The method of claim 11, further comprising:
transmitting the burst-resolution image frames and the look-up table to a remote computer system; and
generating, at the remote computer system, corresponding reconstructed image frames from the burst-resolution image frames via image reconstruction based on the look-up table.

13. An on-vehicle event detection and reporting system, comprising:
a vehicle mounted imaging device configured to capture data comprising a plurality of sequential image frames;
an event detection system configured to detect vehicle and/or driver related events based on the captured video data;
an image control module configured to, at least in response to the detected vehicle and/or driver related events:
cause the imaging device to generate standard-resolution image frames at a standard-frame rate and a standard-resolution, wherein the standard frame rate delineates a reserved processing time that includes a processing time lull that the control module has reserved for processing the standard-resolution image frames but in which the control module is not processing the sequential standard-resolution image frames, and
cause the imaging device to generate one or more burst-resolution image frames at a burst-frame rate and a burst-resolution within the processing time lull, wherein the burst-resolution image frames are generated via pixel sampling at a fraction of the standard resolution.

14. The system of claim 13, wherein the burst-resolution image frames are generated such that corresponding reconstructed image frames can be generated from the burst-resolution image frames via image reconstruction.

15. The system of claim 14, further comprising: a remote system configured to receive the burst-resolution image frames and to generate the corresponding reconstructed image frames therefrom via image reconstruction.

16. The system of claim 13, wherein the processing time lull is idle time between the image processing time reserved by the control module for generating the standard-resolution image frames.

17. The system of claim 13, wherein each of the burst-resolution image frames are generated by pixel sampling corresponding image frames at random, non-overlapping pixel locations.

18. The system of claim 17, wherein the random, non-overlapping pixel locations are stored in a predetermined look-up table and each burst-resolution image frame is associated with a key to the lookup table.

19. The system of claim 18, further comprising:
a remote system configured to receive the burst-resolution image frames and to generate corresponding reconstructed image frames therefrom via image reconstruction and based on the look-up table.

20. The system of claim 13, wherein the imaging device is mounted to the vehicle via a wobbly mount, and wherein the burst-resolution image frames are generated such that corresponding super-resolution image frames can be generated from the burst-resolution image frames via image reconstruction.

\* \* \* \* \*